United States Patent

Seagreaves

[15] 3,655,275
[45] Apr. 11, 1972

[54] METHOD FOR MAKING FIBER OPTIC ASSEMBLY WITH CRIMPED END CONNECTOR

[72] Inventor: George F. Seagreaves, Warren, Ohio
[73] Assignee: General Motors Corporation, Detroit, Mich.
[22] Filed: Nov. 18, 1970
[21] Appl. No.: 90,722

[52] U.S. Cl............................................350/320, 350/96 B
[51] Int. Cl. .......................................................G02b 5/16
[58] Field of Search ..........350/96 B, 320; 339/220 R, 223 R, 339/276 T

[56] References Cited

UNITED STATES PATENTS

| | | | |
|---|---|---|---|
| 2,587,095 | 2/1952 | Bergan | 287/75 |
| 2,622,314 | 12/1952 | Bergan | 29/517 |
| 3,423,581 | 1/1969 | Baer | 350/96 B X |

Primary Examiner—David H. Rubin
Attorney—W. E. Finken and W. A. Schuetz

[57] ABSTRACT

In a preferred form, this disclosure relates to a fiber optic assembly comprising a fiber optic bundle having an outer flexible sheath of a given external diameter and an end connector crimped onto an end portion of the bundle. The end connector is in the form of a metal sleeve and has a section intermediate its ends which is crimped onto the fiber optic bundle. The section is substantially hexagonal in shape, as viewed in cross section, and has substantially flat sides and apices at the intersection of the sides and with the flats lying on an inscribed circle having a diameter which is less than the external diameter of the sheath whereby the sheath is deformed upon the section being crimped thereon so as to have a radial thickness adjacent the flat sides which is less than the radial thickness of the sheath fore and aft of the crimped section.

2 Claims, 7 Drawing Figures

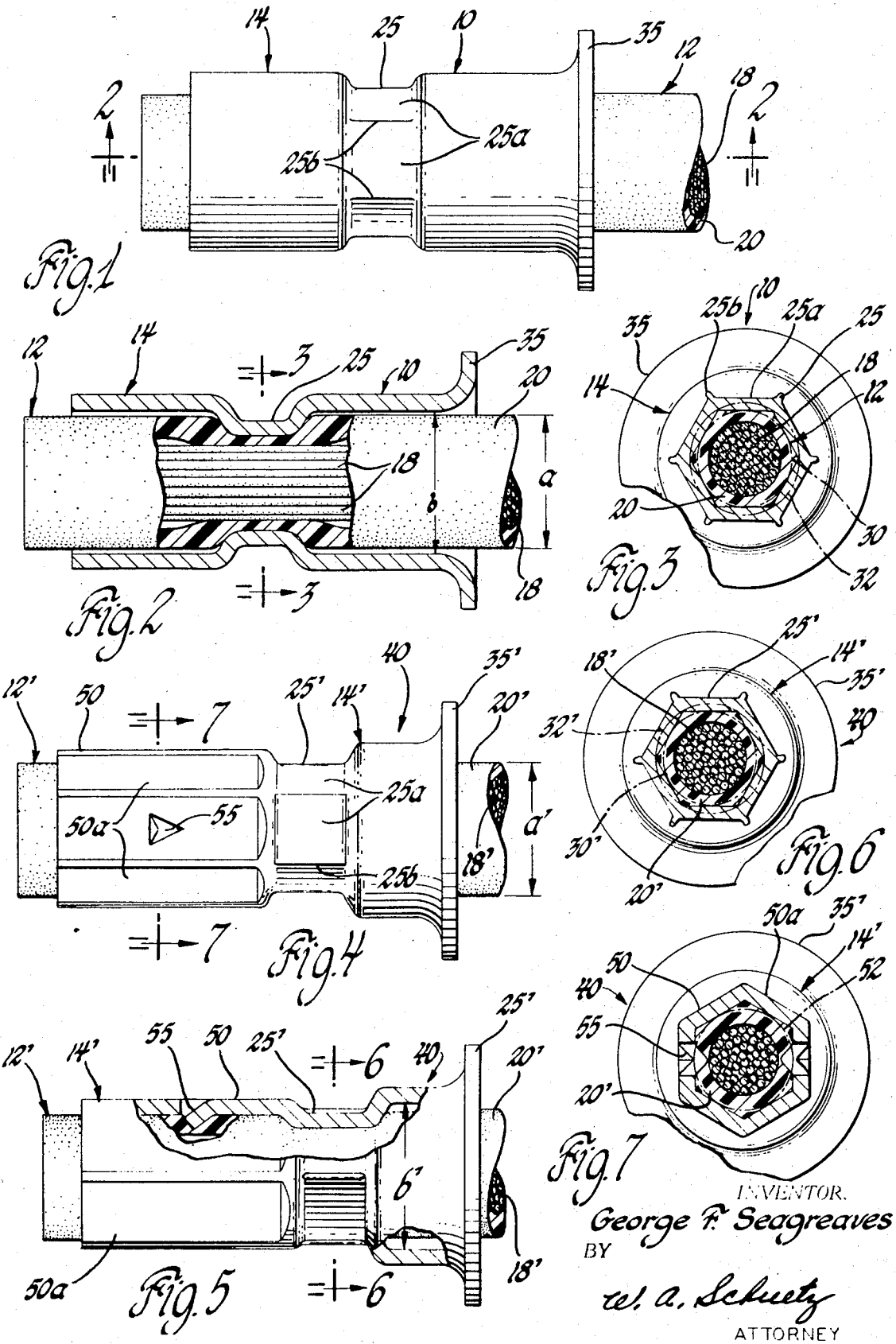

METHOD FOR MAKING FIBER OPTIC ASSEMBLY WITH CRIMPED END CONNECTOR

The present invention relates to a fiber optic assembly comprising a fiber optic bundle having an outer flexible sheath and an end connector having a hexagonal shaped section which is crimped onto an end portion of the bundle, and to a method of making the same.

Fiber optic assemblies are used to transmit light from a light source to a location remote from the light source. For example, in automotive vehicle applications they are used as an indicating means, such as to indicate when a light bulb is burned out, and as a means for illuminating dials, switches, etc.

Fiber optic assemblies usually comprise a fiber optic bundle, plastic lenses or socket bodies positioned adjacent the light source and the remote location to which the light is to be transmitted and end connectors attached to the opposite ends of the fiber optic bundles for connecting the same to the lenses or socket bodies. The fiber optic bundle includes a plurality of plastic or glass fibers or cores, each of which is coated with a substance having a lower light refraction index than the fiber or core, and an opaque flexible, deformable outer sheath or jacket, usually made of plastic, such as polyvinyl chloride, surrounding the fibers or cores for protecting the same.

Providing suitable end connectors for fiber optic bundles which meet required design criteria has presented some difficulty. These criteria are (1) the end connector, when crimped onto the fiber optic bundle, must be able to withstand normal axial thrust loads during assembly, disassembly and normal use without coming off of the plastic sheath and (2) the radial pressure exerted on the bundle by the connector must be kept at a minimum because excess radial pressure exerted against the fiber cores affects the light transmitting capability of the fiber optic bundle.

Also, to maximize the light transmitting capabilities of the fiber optic bundle, the ends thereof are polished. To polish the same it is necessary to coat the same with an epoxy resin to bond the individual fibers together after the end connector is crimped thereon. The crimp has to be of a sufficient tightness to prevent the flow of epoxy therepast due to capillary action.

An object of the present invention is to provide a new and improved fiber optic assembly comprising a fiber optic bundle having an outer flexible sheath of a given external diameter and radial thickness and an end connector in the form of a sleeve having an intermediate section crimped onto the bundle, and in which the crimped intermediate section is substantially polygonal in shape, as viewed in cross section, and has its flat sides lying on an inscribed circle having a diameter which is less than the given diameter of the sheath so that when the section is crimped thereon the radial thickness of the sheath adjacent the flat sides is less than the given radial thickness of the sheath fore and aft of the crimped section whereby the end connector is securely held on the bundle and exerts only a minimal radial pressure on the fibers or cores.

A further object of the present invention is to provide a new and improved fiber optic assembly comprising a fiber optic bundle having an outer deformable sheath of a given external diameter and radial thickness and an end connector in the form of a seamless sleeve having an intermediate section which is crimped onto the bundle, and in which the intermediate section is hexagonal in shape, as viewed in cross section, and has its flat sides lying on an inscribed circle having a diameter which is less than the given diameter of the sheath so that when the intermediate section is crimped onto the bundle the radial thickness of the sheath adjacent the flats is less than the given radial thickness of the sheath fore and aft of the crimped section whereby the end connector is securely held on the bundle and exerts only minimal radial pressure against the fibers.

Yet another object of the present invention is to provide a new and improved fiber optic assembly, as defined in the next preceding object, and wherein the end connector includes a second hexagonal section whose flats lie on an inscribed circle having a diameter slightly less than the diameter of the flexible sheath so that the second section provides surface tension between it and the sheath to aid in securely holding the end connector on the bundle.

Another object of the present invention is to provide a new and improved method of making a fiber optic assembly wherein an annular metal ferrule or end connector is tightly crimped intermediate its ends to a fiber optic bundle to provide a polygonally, preferably hexagonally, crimped section to securely attach the connector to the bundle and to prevent any flow via capillary action of a bonding resin past the crimped section when the end of the fiber optic bundle is subsequently coated with the resin and polished.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which:

FIG. 1 is an elevational view of the preferred embodiment of the fiber optic assembly of the present invention;

FIG. 2 is an axial cross-sectional view taken approximately along line 2—2 of FIG. 1;

FIG. 3 is a cross-sectional view taken approximately along line 3—3 of FIG. 2;

FIG. 4 is a plan view of a second embodiment of the fiber optic assembly of the present invention;

FIG. 5 is a side elevational view with parts shown in section of the assembly shown in FIG. 4;

FIG. 6 is a cross-sectional view taken approximately along line 6—6 of FIG. 5; and FIG. 7 is a cross-sectional view taken approximately along line 7—7 of FIG. 4.

As representing a preferred embodiment of the present invention, FIG. 1 of the drawings shows a fiber optic assembly 10. The fiber optic assembly 10 comprises, in general, a fiber optic bundle 12 and an end connector 14 which is crimped onto an end portion of the fiber optic bundle. The end connector 14 is adapted to be suitably secured to a lense or socket body (not shown) adjacent a light source or a remote location to which the light is to be transmitted.

The fiber optic bundle 12 can be of any suitable or conventional construction and preferably comprises a plurality of light transmitting glass fibers or cores 18 which are individually surrounded by a substance having a lower light refraction index than the fibers or cores 18. Surrounding or encasing the plurality of fibers or cores throughout their length is a flexible outer sheath or jacket 20, preferably made from a plastic material such as polyvinyl chloride. The flexible outer sheath 20 has a given nominal external diameter a and a given radial thickness.

The end connector 14 for connecting the fiber optic bundle 12 to an associated lense or socket body (not shown) comprises a one piece, thin, seamless, metal sleeve or ferrule. The end connector is generally cylindrical and has an internal diameter b which is slightly larger than the nominal external diameter a of the fiber optic bundle 12. The end connector 14 receives an end portion of the fiber optic bundle 12 and includes a section 25 intermediate its ends which is crimped onto the fiber optic bundle 12.

The crimped section 25 is polygonal, preferably hexagonal, in shape, as viewed in cross section. The section 25 is crimped from a circular ring configuration to its hexagonal ring shaped configuration by a suitable punch and die apparatus or crimping tool. The hexagonal shaped section 25 has substantially flat sides 25a and apices 25b at the intersection of the flat sides. The flat sides on their inner surface lie on an inscribed circle 30 having a diameter which is less than the given external diameter of the jacket or sheath. The apices of the hexagonal section 25 at their inner corners lie on a circumscribed circle 32 having a diameter which is no greater than, but preferably less than, the external given diameter of the sheath. When the hexagonal section 25 is crimped onto the sheath, the sheath adjacent the crimped area is deformed and displaced so as to have a radial thickness adjacent the flats and apices which is less than the given radial thickness fore and aft of the section 25, as shown in FIG. 2. This difference in the thickness of the sheath 20 provides sufficient resistance to axial movement of the end connector 14 relative to the bundle 12 when subjected to axial thrust loads and thus, securely retains the end connector 14 on the bundle 12. Also the hexagonal ring shaped crimp section 25, although exerting some radial pressure, does not exert pressure of a magnitude such that the light transmitting capabilities of the fiber optic bundle are impaired. The end connector at one end has a radially extending flange 35 which is adapted to be received within the groove of a suitable lense body (not shown) to securely retain the fiber optic bundle 12 to the lense.

The hexagonal ring crimp section 25 also has another advantage. In the making of the fiber optic assembly 10, the end connector 14 is as shown in FIG. 1. Then crimped onto the bundle 12 adjacent an end portion thereof, the end of the bundle is coated with an epoxy resin to bond the individual fibers together to enable the end thereof to be thereafter polished. This epoxy resin via capilary action travels along the fiber optic bundle. The hexagonal ring crimp section 25 will prevent any travel of epoxy resin therepast.

FIGS. 4 through 7 show an alternate fiber optic assembly 40 constructed in accordance with the present invention. Corresponding parts of the fiber optic assembly 40 shown in FIGS. 4 through 6 will be given the same reference numerals, but with a prime affixed thereto. The fiber optic assembly shown in FIGS. 4-6 also includes a second section 50 adjacent its forward end which is crimped so as to have a hexagonal shape, as viewed in cross section. This latter section 50, however, is not crimped as much as the section 25, but is crimped to the extent that the flats 50a thereof on their inner surface lie on an inscribed circle 52 having a diameter which is slightly less than the external diameter of the sheath 20' so that the sheath 20' will be very slightly deformed and in frictional engagement with the section 50 so as to aid in preventing axial movement of the connector 40 relative to the bundle 12' when subjected to axial thrust loads.

To further increase the resistance to pull off when subjected to axial thrust loads, the second section can also be provided at diametral opposite locations with a pair of inwardly directed darts 55 formed by a suitable tool depressing radially inwardly from the sides. These darts would cut into the sheath 20' of the fiber optic bundle, but not through the same.

Although the illustrated embodiment thereof has been described in great detail, it should be apparent that certain modifications, changes, and adaptations may be made in the illustrated embodiment, and that it is intended to cover all such modifications, changes and adaptations which come within the spirit of the present invention.

What is claimed is:

1. In a method for making a fiber optic assembly which includes the steps of attaching an annular metal end connector adjacent one end of a fiber optic bundle having a plurality of glass cores surrounded by an annular flexible sheath of a given nominal external diameter, coating an end of the fiber optic bundle with a bonding resin to bind the cores together adjacent said end, and polishing the coated end of the fiber optic bundle, the improvement being that said end connector is attached to said bundle by crimping an annular section spaced inwardly from said one end to provide a polygonally shaped section having flat sides and apices at the intersection of the sides and with the sides lying on an inscribed circle having a diameter which is substantially less than the nominal external diameter of the sheath and with the apices at their radially innermost ends lying on an inscribed circle having a diameter no greater than the nominal external diameter of the sheath whereby the sheath has a radial thickness at the sides of the section which is substantially less than its radial thickness fore and aft of the crimped section and whereby said bonding resin is prevented from flowing via capillary action along the fiber optic bundle past the crimped section.

2. In a method for making a fiber optic assembly which includes the steps of attaching an annular, seamless, metal end connector adjacent one end of the fiber optic bundle having a plurality of glass cores surrounded by an annular flexible sheath of a given nominal external diameter, coating an end of the fiber optic bundle with a bonding resin to bind the cores together adjacent said end, and polishing the coated end of the fiber optic bundle, the improvement being that said end connector is attached to said bundle by crimping an annular section spaced inwardly from said one end to provide a hexagonally shaped section, as viewed in cross section, having flat sides and apices at the intersection of the sides and with the sides lying on an inscribed circle having a diameter which is substantially less than the nominal external diameter of the sheath and with the apices at their radially innermost ends lying on an inscribed circle having a diameter which is less than the nominal external diameter of the sheath whereby the sheath has a radial thickness at the sides of the hexagonally shaped section which is substantially less than the radial thickness fore and aft of the crimped section to securely retain the connector on the sheath and whereby said bonding resin is prevented from flowing via capillary action along the bundle past the hexagonally crimped section.

* * * * *

PO-1050
(5/69)

UNITED STATES PATENT OFFICE
CERTIFICATE OF CORRECTION

Patent No. 3,655,275      Dated April 11, 1972

Inventor(s) George F. Seagreaves

It is certified that error appears in the above-identified patent and that said Letters Patent are hereby corrected as shown below:

Column 3, lines 18 through 26 should read -- The hexagonal ring crimp section 25 also has another advantage.  In the making of the fiber optic assembly 10, the end connector 14 is first crimped onto the bundle 12 adjacent an end portion thereof, as shown in Figure 1.  Then the end of the bundle is coated with an epoxy resin to bond the individual fibers together to enable the end thereof to be thereafter polished.  This epoxy resin via capillary action travels along the fiber optic bundle.  The hexagonal ring crimp section 25 will prevent any travel of epoxy resin therepast.--

Signed and sealed this 3rd day of October 1972.

(SEAL)
Attest:

EDWARD M. FLETCHER, JR.      ROBERT GOTTSCHALK
Attesting Officer      Commissioner of Patents